United States Patent [19]

Moriya et al.

[11] Patent Number: 4,670,160

[45] Date of Patent: Jun. 2, 1987

[54] METAL SCAVENGER AND METAL SCAVENGING PROCESS

[75] Inventors: Masafumi Moriya, Kasukabe; Kazuo Hosoda, Saitama; Akira Nishimura, Asaka; Takao Imachi, Chiba, all of Japan

[73] Assignee: Miyoshi Yushi Kabushiki Kaisha, Tokyo, Japan

[21] Appl. No.: 905,977

[22] Filed: Sep. 11, 1986

Related U.S. Application Data

[62] Division of Ser. No. 853,692, Apr. 18, 1986.

[30] Foreign Application Priority Data

Apr. 26, 1985 [JP] Japan ................................. 60-89998
Jul. 5, 1985 [JP] Japan ................................. 60-147693

[51] Int. Cl.$^4$ ............................................. C02F 1/62
[52] U.S. Cl. ................................... 210/728; 210/736; 210/912; 423/DIG. 14; 423/24; 423/54; 423/100; 423/139; 423/89; 528/387; 528/405; 521/32; 75/101 BE
[58] Field of Search ............. 75/101 BE; 423/24, 100, 423/139, 54, DIG. 14, 89; 210/688, 728, 736, 912; 528/405, 387; 521/32

[56] References Cited

U.S. PATENT DOCUMENTS

| | | | |
|---|---|---|---|
| 2,356,764 | 8/1944 | Kern | 528/387 |
| 3,391,090 | 7/1968 | Schiegg | 528/405 |
| 3,655,506 | 4/1972 | Baggett | 528/405 |
| 3,706,706 | 12/1972 | Vandenberg | 528/405 |
| 4,098,867 | 7/1978 | Grinstead et al. | 423/193 |
| 4,191,820 | 3/1980 | Langdon | 528/405 |
| 4,277,566 | 7/1981 | Kataoka et al. | 521/32 |

*Primary Examiner*—John Poll
*Assistant Examiner*—Robert L. Stoll
*Attorney, Agent, or Firm*—Sherman and Shalloway

[57] ABSTRACT

A metal scavenger is composed of an addition product of a polyamine and an epihalohydrin. The addition product contains as substituent or substituents at least one carbodithio group and/or at least one carbodithioate salt group introduced therein by substituting the corresponding number of active hydrogen atom or atoms in the addition product. Metals can be scavenged from waste water by adding the metal scavenger together with at least one of sodium monosulfide, sodium polysulfides and sodium hydrogensulfide.

3 Claims, No Drawings

METAL SCAVENGER AND METAL SCAVENGING PROCESS

This is a division of application Ser. No. 853,692, filed Apr. 18, 1986.

This invention relates to a metal scavenger and a metal scavenging process.

As more and more problems are caused by contamination of rivers, sea and the like by waste water from factories and the like in recent years, stricter regulations have been enacted to avoid contamination by heavy metal ions in waste water. It is now a mandatory requirement to control metals in waste water below their corresponding prescribed concentrations. Particularly stringent regulations have been established against heavy metals harmful to human bodies, such as mercury, cadmium, zinc, lead, copper and chromium. Accordingly, various processes have been proposed to remove heavy metals from waste water. As processes of this sort, there have been known ion flotation, ion exchange, electrolytic floating process, electrodialysis, reverse osmosis, neutralizing coagulation and sedimentation process in which an alkaline neutralizing agent such as slaked lime or caustic soda is thrown to convert metals into their hydroxides, which are then caused to coagulate and precipitate with a high molecular flocculant, etc. As metal scavengers of the above sort, metal scavengers containing aliphatic polydithiocarbamic acids or their salts (Japanese Patent Laid-Open No. 99978/1974).

Ion flotation, ion exchange, electrolytic floating process, electrodialysis and reverse osmosis process are however dissatisfactory with respect to the removal rate of heavy metals, operability, running cost, etc. Under the circumstances, they are used only for certain special waste water treatments. On the other hand, the neutralizing coagulation and sedimentation process leads to production of metal hydroxide sludge in an enormous volume. Since this metal hydroxide sludge has poor dewatering characteristics and is bulky, it is accompanied by a drawback that its transportation is difficult. In addition, it is very difficult to lower the contents of heavy metals in the metal hydroxide sludge below their corresponding levels specified by the effluent standard. Moreover, this sludge involves a further problem that it may be dissolved again to develop a secondary pollution depending on the manner of its disposal.

On the other hand, the above-described problems themselves may be solved when metals are scavenged and removed with a metal scavenger containing an aliphatic polydithiocarbamic acid or its salt. However, this metal scavenger has to be added in a large amount because its molecular weight is small. It is also accompanied by further shortcomings that the resulting floc is small and has poor settling characteristics.

With the foregoing in view, the present inventors have carried out an extensive investigation. As a result, it has been found that an addition product of a polyamine and an epihalohydrin, said addition product containing as substituent or substituents at least one carbodithio group and/or at least one carbodithioate salt group introduced therein by substituting the corresponding number of active hydrogen atom or atoms in the addition product, has excellent properties as a metal scavenger and combined use of the metal scavenger with at least one of sodium monosulfide, sodium polysulfides and sodium hydrogensulfide permits the most efficient scavenging of metal ions from waste water. The above findings have then led to completion of the present invention.

In one aspect of this invention, there is thus provided a metal scavenger which comprises an addition product of a polyamine and an epihalohydrin, said addition product containing as substituent or substituents at least one carbodithio group and/or at least one carbodithioate salt group introduced therein by substituting the corresponding number of active hydrogen atom or atoms in the addition product.

In another aspect of this invention, there is also provided a process for scavenging a metal, which comprises adding a metal scavenger, which is composed of an addition product of a polyamine and an epihalohydrin in which the addition product contains as substituent or substituents at least one carbodithio group and/or at least one carbodithioate salt group introduced therein by substituting the corresponding number of active hydrogen atom or atoms in the addition product, together with at least one of sodium monosulfide, sodium polysulfides and sodium hydrogensulfide to waste water containing metal ions so as to scavenge and remove the metal ions from the waste water.

Since the metal scavenger of this invention has a structure in which at least one carbodithio group and/or at least one carbodithioate salt group have substituted, as substituents, for the corresponding number of active hydrogen atoms in an addition product obtained by the additive reaction of the polyamine and epihalohydrin, it can perform sufficient metal adsorption treatments when added in amounts smaller than conventional metal scavengers which contain aliphatic polydithiocarbamic acids or their salts. In addition, the metal scavenger of this invention can form greater floc as a result of metal collection. It thus has an advantage that the floc has a faster settling velocity and metals can hence be collected promptly for their removal from waste water. According to the process of this invention in which the metal scavenger of this invention is added together with at least one of sodium monosulfide, sodium polysulfides and sodium hydrogensulfide to waste water so as to remove metal ions in waste water, the metal scavenger and sodium sulfide cooperate synergistically to bring about further advantages over the single use of the metal scavenger of this invention that the settling velocity of floc is increased further and metal ions can thus scavenged with extreme good efficiency from waste water.

The above and other objects, features and advantages of this invention will become apparent from the following description of the invention and the appended claims.

The metal scavenger of this invention is a compound of a structure which contains, as substituent or substituents for active hydrogen atom or atoms in the addition product, at least one carbodithio group, -CSSH, and/or at least one carbodithioate salt group. As will be described herein, it can be obtained by subject a polyamine and an epihalohydrin to additive reaction and then introducing at least one carbodithio group and/or at least one carbodithioate salt group as substituent or substituents into the resultant addition product or by introducing at least one carbodithio group and/or at least one carbodithioate salt group as substituent or substituents in a polyamine and then subjecting the resultant polyamine derivative and an epihalohydrin to additive reaction.

The above-mentioned active hydrogen atom or atoms, which are substituted by said at least one carbodithio group and/or at least one carbodithioate salt group, are hydrogen atom or atoms bonded to nitrogen atom or atoms of the polyamine and/or hydrogen atom or atoms of hydroxyl group or groups formed in skeletal epihalohydrin unit or units upon additive reaction of the polyamine and epihalohydrin. The metal scavenger of this invention may have either a structure in which at least one carbodithio group and/or at least one carbodithioate salt group are bonded to nitrogen atom or atoms in the addition product or a structure in which at least one carbodithio group and/or at least one carbodithioate salt group substitute for hydrogen atom or atoms of hydroxyl group or groups formed in skeletal epihalohydrin unit or units upon additive reaction of the polyamine and epihalohydrin. As a further also have a structure in which at least one carbodithio group and/or at least one carbodithioate salt group (when only one of these two types of substituents is contained, at least two substituents of the same type) are bonded respectively to the nitrogen atom or atoms and the oxygen atom or atoms. As illustrative examples of the above mentioned carbodithioate salt group, may be mentioned alkali metal salts such as its sodium salt and potassium salt, alkaline earth metal salts such as its calcium salt and magnesium salt, and its ammonium salt.

In the metal scavenger of this invention, one or more alkyl groups, hydroxyalkyl groups and/or acyl groups may be bonded as N-substituent or N-substituents to one or more nitrogen atoms in the addition product. These N-substituent or substituents may be introduced by reacting the polyamine, prior to its additive reaction with the epihalohydrin, with an alkyl halide such as methyl halide, ethyl halide, butyl halide, lauryl halide or stearyl halide, an epoxy alkane such as ethylene oxide, propylene oxide, butylene oxide, styrene oxide, 1,2-dodecylepoxyalkane or 1,2-octacosylepoxyalkane, a fatty acid such as acetic acid, propionic acid, butyric acid, caproic acid, caprylic acid, lauric acid, myristic acid, palmitic acid, stearic acid or behenic acid, a fatty acid derivative such as an ester or acid halide of the above fatty acid; or by subjecting the polyamide and epihalohydrin to additive reaction and then reacting the resultant addition product with an alkyl halide, epoxy alkane or fatty acid derivative such as that described above. When two or more N-substituents are contained per molecule of the metal scavenger, they may be of the same type or of different types.

The term "polyamine" as used herein means a compound containing two or more imino or amino groups each of which is formed by one or two active hydrogen atoms bonded to a nitrogen atom. As exemplary polyamines, may be mentioned polyalkylenepolyamines such as ethylenediamine, propylenediamine, butylenediamine, hexamethylenediamine, diethylenetriamine, dipropylenetriamine, dibutylenetriamine, triethylenetetramine, tripropylenetetramine, tributylenetetramine, tetraethylenepentamine, tetrapropylenepentamine, tetrabutylenepentamine and pentaethylenehexamine; phenylenediamine; xylenediamine; methaxylenediamine; iminobispropylamine; monomethylaminopropylamine; methyliminobispropylamine; 1,3-bis(aminomethyl)cyclohexane; 1,3-diaminopropane; 1,4-diaminobutane; 3,5-diaminochlorobenzene; melamine; 1-aminoethylpiperazine; piperazine; diaminophenyl ether; 3,3'-dichlorobenzidine; tolidine base; m-toluylenediamine; and polyethylenepolyimine (average molecular weight: 300 or higher); and so on. In addition, the following compounds may also be mentioned by way of example as N-alkylpolyamines, N-hydroxyalkylpolyamines and N-acylpolyamines obtained respectively by reacting alkyl halides, epoxyalkanes and fatty acid derivatives with the above-described polyamines. As N-alkylpolyamines, it is possible to use N-alkylethylenediamines, N-alkylpropylenediamines, N-alkylhexamethylenediamines, N-alkylphenylenediamines, N-alkylxylenediamines, N-alkyldiethylenetriamines, N-alkyltriethylenetetramines, N-alkyltetraethylenepentamines, N-alkylpentaethylenehexamine, etc. The above N-substituted alkyl groups may preferably have 2 to 18 carbon atoms. Illustrative of N-hydroxyalkylpolyamines include N-hydroxyethylpolyamine, N-hydroxypropylpolyamine, N-hydroxybutylpolyamine, N-$\beta$-hydroxydodecylpolyamine, N-$\beta$-hydroxytetradecylpolyamine, N-$\beta$-hydroxyhexadecylpolyamine, N-$\beta$-hydroxyoctadecylpolyamine, N-$\beta$-hydroxyoctacosylpolyamine, etc. As exemplary N-acylpolyamines, may be mentioned N-acetylpolyamine, N-propionylpolyamine, N-butyrylpolyamine, N-caproylpolyamine, N-lauroylpolyamine, N-oleoylpolyamine, N-myristyloylpolyamine, N-stearoylpolyamine, N-behenoylpolyamine, and so on. These polyamines may be used either singly or in combination. On the other hand, epichlorohydrin, epibromohydrin, epiiodohydrin and the like may be mentioned as epihalohydrins which are subjected to addition with these polyamines.

The metal scavenger of this invention has a linear structure and generally shows water-solubility, when the polyamine polycondensed with the epihalohydrin (if one or more substituents are introduced in the polyamine prior to its polycondensation with the epihalohydrin, the unsubstituted polyamine) is a diamine with two amino groups. When the metal scavenger has a cross-linked structure, it forms either dispersion or suspension upon its mixing with water.

A preparation process of the metal scavenger of this invention will next be described specifically.

In the first process for the preparation of the metal scavenger of this invention, the polyamine and epihalohydrin are subjected to additive reaction. Carbon disulfide is then caused to act on the addition product. According to this process, the polyamine and epihalohydrin are first of all subjected to additive reaction so as to obtain the addition product. This addition product is obtained by adding the epihalohydrin dropwise to the polyamine while heating and stirring the latter and then heating the resultant reaction mixture for 1–20 hours or preferably 1–6 hours. The heating temperature for the polyamine upon the dropwise addition of the epihalohydrin may be 10°–100° C. or preferably 30°–90° C. After completion of the dropwise addition of the epihalohydrin, the heating temperature may be 10°–150° C. or preferably 30°–100° C. The addition product and carbon disulfide are then heated at 10°–100° C. for 1–20 hours or preferably at 30°–60° C. for 1–8 hours in the presence of an alkali, whereby carbodithio groups and/or carbodithioate salt groups are introduced as substituents in the addition product to obtain the metal scavenger of this invention. It is possible to use, as the above-described alkali, lithium hydroxide, potassium hydroxide, sodium hydroxide, calcium hydroxide, magnesium hydroxide, ammonium hydroxide or the like. As a useful solvent, may be mentioned water, methanol, acetone, dioxane, toluene, dimethylformamide and the like with water, acetone and dioxane being particularly preferred.

In the second process for preparing the metal scavenger of this invention, carbon disulfide is caused to act on the polyamine to produce a polyamine derivative which contains one or more carbodithio groups or carbodithioate salt groups, and the polyamine derivative is then subjected to additive reaction with the epihalohydrin. The reaction between the polyamine and carbon disulfide is effected by heating the polyamine and carbon disulfide in the presence of an alkali at 10°–100° C. for 1–20 hours or preferably at 30°–60° C. for 1–5 hours. As the alkali employed upon reaction of carbon disulfide with the polyamine, the same alkali as that employed in the above-described first process may be used. The above reaction may be conducted in a solvent if necessary. As the solvent, the same solvent as that employed in the above-described first process may be used. Water, acetone and dioxane are particularly preferred. Then, the polyamine derivative with one or more carbodithio groups or carbodithioate salt groups introduced as substituents therein is subjected to additive reaction with an epihalohydrin. This reaction is effected by heating the above polyamine derivative at 10°–100° C. or preferably 30°–90° C., adding the epihalohydrin dropwise with stirring and then maintaining the resultant mixture at 10°–150° C. for 1–20 hours or preferably at 30°–100° C. for 1–6 hours.

In the above manner, it is possible to obtain the metal scavenger of this invention which contains one or more carbothio groups and/or one or more carbodithioate salt groups as substituents. A metal scavenger containing one or more alkali metal or ammonium carbodithioate groups as substituents may be converted to a metal scavenger containing one or more alkaline earth carbodithioate groups as substituents by treating the former metal scavenger with a water-soluble alkaline earth metal salt, e.g., the hydroxide, chloride, nitrate or sulfate of calcium, magnesium or the like and substituting the alkali metal with the alkaline earth metal.

In the metal scavenging process of this invention, the above-mentioned metal scavenger of this invention is added together with at least one of sodium monosulfide, sodium polysulfides and sodium hydrogen-sulfide to waste water containing heavy metal ions so as to precipitate and remove metal ions as floc from the waste water. As the sodium polysulfides, may be employed sodium disulfide, sodium trisulfide, sodium tetrasulfide or sodium pentasulfide. Although the metal scavenger of this invention can scavenge with good efficiency metals such as mercury, cadmium, zinc, lead, copper, chromium, arsenic, gold, silver, platinum, vanadium and the like, its combined use with the above-described sodium sulfide permits formation of greater floc, thereby reducing the time required for allowing the floc to settle and achieving more efficient scavenging of metal ions from waste water. The above-mentioned sodium sulfide has complex-forming activity for metal ions. Since the resulting floc is extremely small when used singly, it is difficult to allow the floc to settle for its removal. The sodium sulfide can achieve efficient scavenging of metal ions from waste water for the first time when it is used in combination with the metal scavenger of this invention. This effect appears to be brought about by synergistic cooperation of the complex-forming activity of the metal scavenger of this invention for metal ions and that of the sodium sulfide for metal ions. It is therefore preferable to add the metal scavenger and sodium sulfide in a total amount of 0.7–4 mole equivalents or especially 0.9–1.5 mole equivalents based on the amount of metal ions in waste water. The objects of this invention can be attained so long as the weight ratio of the metal scavenger to sodium sulfide falls within a range of from 1:99 to 99:1 with 20:80–98:2 being particularly preferred. The metal scavenger and sodium sulfide may be mixed together in advance and then added to waste water. Alternatively, they may be separately added to waste water. It is however preferred to add them after mixing them together beforehand. When they are added separately, their metal-ion removing effects are substantially equal no matter whether the metal scavenger is added first and the sodium sulfide is then added or they are added in the opposite order.

Upon adding the metal scavenger and sodium sulfide to waste water to scavenge metal ions in the waste water in accordance with this invention, it is preferable to adjust the pH of the waste water to 3–10 or notably 4–9. As an acid or alkali to be employed for the pH adjustment, any acid or alkali maybe used so long as it does not impair floc formation. However, in general, hydrochloric acid, sulfuric acid, nitric acid or the like is employed as an acid while sodium hydroxide, potassium hydroxide, calcium hydroxide or the like is used as an alkali.

The present invention will hereinafter be described in further detail by the following Examples:

EXAMPLE 1

In a 4-neck flask having an internal capacity of 1 l and fitted with a stirrer, thermometer, dropping funnel and reflux condenser, 261.1 g of meta-xylylenediamine and 300 g of a 1:1 mixture of water and acetone were charged. The contents were heated at 60° C. with stirring, to which 174 g of epichlorohydrin was added dropwise over 4 hours while controlling the temperature of the resulting mixture not to exceed 90° C. After completion of the dropwise addition, the reaction mixture was maintained at 80°–90° C. for 1 hour to obtain 727 g of a water-acetone solution of an addition product of meta-xylylenediamine and epichlorohydrin.

Thereafter, 234.1 g of the above addition product, 517.4 g of purified water and 59.9 g of sodium hydroxide were charged in a reactor similar to the reactor employed above. While stirring the contents at 40° C., 86.9 g of carbon disulfide was added dropwise over 3 hours. After maintaining the reaction mixture at the same temperature for 1 hour, acetone and water were distilled off at 60°–90° C. to obtain a metal scavenger. The viscosity of a 27.2 wt. % aqueous solution of the metal scavenger was 84 mPa.s(25° C.).

The 27.2 wt. % aqueous solution of the above metal scavenger was then added to an aqueous solution, which contained 100 mg/l of $Cu^{2+}$, in such amounts that the metal scavenger was contained at concentrations of 40 mg, 85 mg, 125 mg and 165 mg per liter of the aqueous solution respectively. The resultant mixtures were thereafter stirred for 10 minutes, the resultant precipitates formed as a result of collection of copper on the metal scavenger were separated, and the concentrations of $Cu^{2+}$ still remaining in the solutions were measured respectively. They were found to be 60 mg/l, 28 mg/l, 13 mg/l and 0.05 mg/l respectively. From those measurement results, the amounts of $Cu^{2+}$ collected on the metal scavenger were calculated. It was found to be 300 mg Cu per gram of the scavenger (300 mg-Cu/g). An experiment similar to the above-described experiment on the copper-containing aqueous solution was also conducted using an aqueous solution which contained 100 mg/l of $Hg^{2+}$. From results of the experiment, the amount of $Hg^{2+}$ collected on the metal scavenger was calculated. It was found to be 1172 mg-Hg/g.

The sodium sulfides shown in Table 1 were separately mixed with the above-described metal scavenger in their corresponding amounts given in the same table per 100 parts by weight of the metal scavenger. To 1000 ml samples of four types of aqueous solutions, namely, $Cu^{2+}$-containing aqueous solution, $Cd^{2+}$-containing aqueous solution, $Hg^{2+}$-containing aqueous solution and $Pb^{2+}$-containing aqueous solution in each of which the content of the corresponding metal ions was 50 ppm and pH was 5.0, the above-prepared mixtures were added as their 0.5 wt. % aqueous solutions in their corresponding amounts given in Table 1. After stirring the resultant mixtures for 5 minutes, they were allowed to stand and the time periods required until precipitation of the resultant flocs were measured. Results are shown in Table 1. After filtering off the resultant flocs, the concentrations of the metal ions remaining in the filtrates were respectively measured by atomic-absorption spectroscopy. Measurement results are shown in Table 1, along with the amounts of the flocs recovered by the filtration.

Using a solution which contained only 0.5 wt. % of the metal scavenger in water, floc precipitation time periods, amounts of flocs formed, and the concentrations of metal ions remaining in filtrates were measured in the same manner. As a result, the floc precipitation time periods were 30 minutes (the aqueous $Cu^{2+}$ solution), 32 minutes (the aqueous $Cd^{2+}$ solution), 26 minutes (the aqueous $Hg^{2+}$ solution) and 25 minutes (the aqueous $Pb^{2+}$ solution); the amounts of produced flocs were 56 ml (the aqueous $Cu^{2+}$ solution), 40 ml (the aqueous $Cd^{2+}$ solution), 30 ml (the aqueous $Hg^{2+}$ solution) and 32 ml (the aqueous $Pb^{2+}$ solution); and the concentrations of the metal ions remaining in the filtrates were 8.2 ppm (the aqueous $Cu^{2+}$ solution), 13.5 ppm (the aqueous $Cd^{2+}$ solution), 5.9 ppm (the aqueous $Hg^{2+}$ solution) and 21.6 ppm (the aqueous $Pb^{2+}$ solution).

EXAMPLE 2

Charged in a reactor similar to that employed in Example 1 were 30.6 g of ethylenediamine, 450 g of purified water and 57.2 g of potassium hydroxide. After dropping 77.5 g of carbon disulfide at 50° C. over 4 hours, the contents were heated at 60° C. for 3 hour to obtain an ethylenediamine derivative containing potassium carbodithioate salt group as a substituent. The reaction mixture was then cooled to 30° C. After adding 47.2 g of epichlorohydrin dropwise to the thus-cooled reaction mixture over 5 hours, their additive reaction was allowed to proceed for 3 hours at 70°–90° C. Thereafter, 308 g of purified water was added to the resultant reaction product to obtain a 20 wt. % aqueous solution of a metal scavenger. The viscosity of the aqueous solution was 32 mPa.s(25° C.).

Using the above-prepared aqueous solution of the metal scavenger, a copper-containing aqueous solution (100 mg/l aqueous solution of $Cu^{2+}$) and a mercury-containing aqueous solution (100 mg/l aqueous solution of $Hg^{2+}$) both of which were similar to those employed in Example 1 were treated in the same manner as in Example 1. From results of the treatment, the amounts of $Cu^{2+}$ and $Hg^{2+}$ collected on the metal scavenger were respectively determined. They were 168 mg-Cu/g and 637 mg-Hg/g respectively.

Then, the sodium sulfides shown in Table 1 were separately mixed with the above-described aqueous metal scavenger solution in their corresponding amounts given in the same table per 100 parts by weight of the aqueous metal scavenger solution. To 1000 ml samples of four types of aqueous solutions similar to those employed in Example 1, the above-prepared mixtures were added as their 2 wt. % aqueous solutions in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 3

In a 4-neck flask having an internal capacity of 500 ml and fitted with a thermometer, reflux condenser, stirrer, and dropping funnel, 71.2 g of meta-xylylenediamine and 279 g of a 7.5% aqueous solution of sodium hydroxide. While vigorously stirring the contents at 45° C., 79.6 g of carbon disulfide was added dropwise over 6 hours. After completion of the dropwise addition, their reaction was allowed to proceed at the same temperature for 1.5 hours and then at 70° C. for 2 hours, thereby obtaining an aqueous solution of a reaction product which contained one carbodithio group and one sodium carbodithioate salt group as substituents.

Thereafter, 400 g of the above aqueous solution and 267.3 g of purified water were charged in a reactor similar to the reactor employed above, followed by addition of 50.3 g of epichlorohydrin at 60° C. over 4 hours. They were reacted at 70°–80° C. for further 1 hour to obtain an aqueous solution of the metal scavenger.

The metal scavenger was contained at 28.1 wt. % in its aqueous solution obtained above. Further, the viscosity of the aqueous solution of the metal scavenger was 73 mPa.s(25° C.).

Using the above aqueous solution of the metal scavenger, the amounts of $Cu^{2+}$ and $Hg^{2+}$ collected on the metal scavenger were respectively determined in the same manner as in Example 1. They were 300 mg-Cu/g and 1143 mg-Hg/g respectively.

The sodium sulfides shown in Table 1 were separately mixed with the above-described metal scavenger in their corresponding amounts given in the same table per 100 parts by weight of the aqueous solution of the metal scavenger, followed by addition of purified water to form 2 wt. % aqueous solutions. To 1000 ml samples of four types of aqueous solutions similar to those employed in Example 1, the above 2 wt. % aqueous solutions were added in their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 4

Charged in a reactor similar to that employed in Example 1 were 21.0 g of diethylenetridiamine, 326.4 g of purified water and 24.5 g of sodium hydroxide, followed by dropwise addition of 46.5 g of carbon disulfide at 40° C. over 3 hours. After completion of the dropwise addition, the reaction was allowed to proceed at 70° C. The reaction mixture was then cooled to 30° C. After dropwise addition of 34.4 g of epibromohydrin over 2 hours, the reaction mixture was heated to 80°–90° C., at which their reaction was allowed to proceed for 2 hours to obtain a 27.1 wt. % aqueous solution of a metal scavenger. The viscosity of the aqueous solution was 58 mPa.s(25° C.).

Using the above-prepared aqueous solution of the metal scavenger, the amounts of $Cu^{2+}$ and $Hg^{2+}$ collected on the metal scavenger were respectively determined in the same manner as in Example 1. They were 169 mg-Cu/g and 651 mg-Hg/g respectively.

Then, the sodium sulfides shown in Table 1 were separately mixed with the above-described aqueous metal scavenger solution in their corresponding amounts given in the same table per 100 parts by weight of the aqueous metal scavenger solution, followed by addition of purified water to obtain 2 wt. % aqueous solutions. To 1000 ml samples of aqueous solutions of four types of metal ions similar to those employed in Example 1, the above-prepared 2 wt. % aqueous solutions were added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 5

Charged in a reactor similar to that employed in Example 1 were 29.9 g of diethylenetriamine and 120 g of toluene, to which 26.8 g of epichlorohydrin was added at 40°–50° C. over 3 hours. After completion of the dropwise addition, the reaction was allowed to proceed at 60° C. for 2 hours. Then, 46.4 9 of sodium hydroxide and 641.8 g of purified water were added to the reaction mixture, followed by dropwise addition of 66.1 g of carbon disulfide at 40° C. over 2 hours. After the dropwise addition, the reaction was allowed to proceed at 70° C. for 4 hours. After completion of the reaction, the reaction mixture was cooled to 30° C. and the stirring was stopped, thereby allowing the reaction mixture to separate into two layers. After removing toluene from the upper layer, the residue was heated to 40° C. at which 48.9 g of epibromohydrin was dropped over 3 hours. After completion of the dropwise addition, the reaction was allowed to proceed at 70°–80° C. for 1 hour to obtain an aqueous solution of a metal scavenger. The metal scavenger was contained at 22.6 wt. % in the thus-obtained aqueous solution. The viscosity of the aqueous solution was 32 mPa.s(25° C.).

Using the above-prepared aqueous solution of the metal scavenger, the amounts of $Cu^{2+}$ and $Hg^{2+}$ collected on the metal scavenger were respectively determined in the same manner as in Example 1. They were 145 mg-Cu/g and 546 mg-Hg/g respectively.

Then, the sodium sulfides shown in Table 1 were separately mixed with the above-described aqueous metal scavenger solution in their corresponding amounts given in the same table per 100 parts by weight of the aqueous metal scavenger solution, followed by addition of purified water to obtain 2 wt. % aqueous solutions. To 1000 ml samples of aqueous solutions of four types of metal ions similar to those employed in Example 1, the above-prepared 2 wt. % aqueous solutions were added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 6

Charged in a reactor similar to that employed in Example 1 were 31.1 g of diethylenetriamine, to which 123.2 g of an epoxy alkane (the number of carbon atoms in the alkyl group: 28) was added dropwise at 90° C., in the course of 30 minutes. After completion of the dropwise addition, the reaction was allowed to proceed at the same temperature for further 2 hours to obtain an N-hydroxyalkyldiethylenetriamine. After cooling the reaction mixture to 40° C. and then adding 667.7 g of purified water and 24.2 g of sodium hydroxide to the thus-cooled reaction mixture, 45.9 g of carbon disulfide was added over 2 hours. After the dropwise addition, the reaction was allowed to proceed at 70° C. for 3 hours. After completion of the reaction, 27.9 g of epichlorohydrin was added dropwise at 80°–90° C. over 3 hours. Subsequent to completion of the dropwise addition, the reaction was allowed to proceed further at 90°–100° C. for 3 hours.

The reaction product obtained in the above-described manner was added with 260.9 g of purified water to obtain an aqueous solution containing 20.0 wt. % of a metal scavenger. The viscosity of the aqueous solution was 45 mPa.s(25° C.).

Using the above-prepared aqueous solution, the amounts of $Cu^{2+}$ and $Hg^{2+}$ collected on the metal scavenger were respectively determined in the same manner as in Example 1. They were 80 mg-Cu/g and 302 mg-Hg/g respectively.

Then, the sodium sulfides shown in Table 1 were separately mixed with the above-described aqueous metal scavenger solution in their corresponding amounts given in the same table per 100 parts by weight of the aqueous metal scavenger solution, followed by addition of purified water to obtain 2 wt. % aqueous solutions. To 1000 ml samples of aqueous solutions of four types of metal ions similar to those employed in Example 1, the above-prepared 2 wt. % aqueous solutions were added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 7

Charged in a reactor similar to that employed in Example 3 was 62.7 g of N,N''''-bis(hydroxyethyl)triethylenetetramine, followed by 24.8 g of epichlorohydrin at 50° C. over 4 hours. After completion of the dropwise addition, the reaction was allowed to proceed further at 80°–90° C. for 2 hours. Then, 672.7 g of an 8% aqueous solution of sodium hydroxide was added to the reaction mixture, followed by dropwise addition of 81.5 g of carbon disulfide at 50° C. over 2 hours. After completion of the dropwise addition, the reaction mixture was heated to 70° C. and the reaction was allowed to proceed at the same temperature for 3 hours to obtain an aqueous solution containing 22.3 wt. % of a metal scavenger. The viscosity of the aqueous solution was 48 mPa.s(25° C.).

Using the above-prepared aqueous solution of the metal scavenger, the amounts of $Cu^{2+}$ and $Hg^{2+}$ and $Hg^{2+}$ collected on the metal scavenger were respectively determined in the same manner as in Example 1. They were 177 mg-Cu/g and 666 mg-Hg/g respectively.

Then, the sodium sulfides shown in Table 1 were separately mixed with the above-described aqueous metal scavenger solution in their corresponding amounts given in the same table per 100 parts by weight of the aqueous metal scavenger solution, followed by addition of purified water to obtain 2 wt. % aqueous solutions. To 1000 ml samples of aqueous solutions of four types of metal ions similar to those employed in Example 1, the above-prepared 2 wt. % aqueous solutions were added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 8

Charged in a reactor similar to that employed in Example 1 were 22.4 g of polyethyleneimine (average molecular weight: 70,000) and 933.2 g of a 1.1% aqueous solution of sodium hydroxide, followed by dropwise addition of 19.7 g of carbon disulfide at 50° C. over 1 hour. After completion of the dropwise addition, the reaction was allowed to proceed at the same temperature for further 2 hours. Then, 0.5 g of epichlorohydrin was added dropwise over 3 hours and the reaction was thereafter allowed to proceed at 80° C. for 2 hours. The resultant reaction product had a viscosity of 28 mPa.s(25° C.) and contained 5 wt. % of a metal scavenger.

Using the above-prepared aqueous solution of the metal scavenger, the amounts of $Cu^{2+}$ and $Hg^{2+}$ collected on the metal scavenger were respectively determined in the same manner as in Example 1. They were 214 mg-Cu/g and 821 mg-Hg/g respectively.

Then, the sodium sulfides shown in Table 1 were separately mixed with the above-described aqueous metal scavenger solution in their corresponding amounts given in the same table per 100 parts by weight of the aqueous metal scavenger solution, followed by addition of purified water to obtain 9 wt. % aqueous solutions. To 1000 ml samples of aqueous solutions of four types of metal ions similar to those employed in Example 1, the above-prepared 9 wt. % aqueous solutions were added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 9

Charged in a reactor similar to that employed in Example 3 were 42.5 g of N-methyldiethylenetriamine and 50 g of a 2:1 mixture of water and dioxane, to which dropwise addition of 33.6 g of epichlorohydrin was started at 70° C. The epichlorohydrin was dropped in the course of 4 hours while controlling the temperature of the contents not to exceed 95° C. Then, the reaction was allowed to proceed further at 90°–95° C. for 2 hours. The reaction mixture was then cooled to 40° C., to which 230 g of purified water and 43.6 g of sodium hydroxide were added. Thereafter, 55.3 g of carbon disulfide was added dropwise over 3 hours. After completion of the dropwise addition, the reaction mixture was subjected to topping at 70° C. and reduced pressure until no dioxane was detected. Then, 120 g of purified water was added to obtain an aqueous solution of a metal scavenger. The concentration of the metal scavenger in the thus-obtained aqueous solution was 22.5 wt. % and the viscosity of the aqueous solution was 31 mPa.s(25° C.).

Using the above-prepared aqueous solution of the metal scavenger, the amounts of $Cu^{2+}$ and $Hg^{2+}$ collected on the metal scavenger were respectively determined in the same manner as in Example 1. They were 157 mg-Cu/g and 594 mg-Hg/g respectively.

Then, the sodium sulfides shown in Table 1 were separately mixed with the above-described aqueous metal scavenger solution in their corresponding amounts given in the same table per 100 parts by weight of the aqueous metal scavenger solution, followed by addition of purified water to obtain 2 wt. % aqueous solutions. To 1000 ml samples of aqueous solutions of four types of metal ions similar to those employed in Example 1, the above-prepared 2 wt. % aqueous solutions were added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

EXAMPLE 10

Charged in a reactor similar to that employed in Example 1 were 64 g of N-methylethylenediamine, 619.9 g of purified water and 34.6 g of sodium hydroxide, followed by dropwise addition of 65.7 g of carbon disulfide at 50° C. over 3 hour. After completion of the dropwise addition, the reaction was allowed to proceed further at 70° C. for 2 hours. Subsequent to completion of the reaction, the reaction mixture was cooled to 30° C. and 79.9 g of epichlorohydrin was added dropwise at 70° C. over 3 hours. The reaction was allowed to proceed further at the same temperature for 3 hours to obtain an aqueous solution of a metal scavenger.

The concentration of the metal scavenger in the thus-obtained aqueous solution was 26.5 wt. % and the viscosity of the aqueous solution was 88 mPa.s(25° C.).

Using the above-prepared aqueous solution of the metal scavenger, the amounts of $Cu^{2+}$ and $Hg^{2+}$ collected on the metal scavenger were respectively determined in the same manner as in Example 1. They were 130 mg-Cu/g and 430 mg-Hg/g respectively.

Then, the sodium sulfides shown in Table 2 were separately mixed with the above-described aqueous metal scavenger solution in their corresponding amounts given in the same table per 100 parts by weight of the aqueous metal scavenger solution, followed by addition of purified water to obtain 2 wt. % aqueous solutions. To 1000 ml samples of aqueous solutions of four types of metal ions similar to those employed in Example 1, the above-prepared 2 wt. % aqueous solutions were added in the their corresponding amounts given in Table 2. In the same manner as in Example 1, 24 experiments different in the type and/or amount of added sodium sulfide were conducted to measure the floc precipitation time periods, amounts of formed flocs and the concentrations of the metal ions remaining in the filtrates were measured respectively. Results are also shown in Table 2.

COMPARATIVE EXAMPLE 1

Charged in a reactor similar to that employed in Example 1 were 30.6 g of ethylenediamine, 450 g of purified water and 57.2 g of potassium hydroxide, followed by addition of 77.5 g of carbon disulfide under the same conditions as those employed in Example 2 to obtain a reaction product. Water was then added to the reaction product to obtain a 20 wt. % aqueous solution. The viscosity of the aqueous solution was 4 mPa.s(25° C.).

Using the above-prepared aqueous solution, the amounts of $Cu^{2+}$ and $Hg^{2+}$ collected on the metal scavenger were respectively determined in the same manner as in Example 1. They were 108 mg-Cu/g and 403 mg-Hg/g respectively.

Further, sodium pentasulfide and purified water were mixed with the above-described reaction product in their corresponding amounts given in Table 1 per 100 parts by weight of the reaction product to obtain a 2 wt. % aqueous solution. To 1000 ml samples of aqueous solutions of four types of metal ions similar to those employed in Example 1, the above-prepared 2 wt. % aqueous solution was added in the its corresponding amounts given in Table 1. In the same manner as in Example 1, the floc precipitation time periods, amounts of formed flocs and the concentrations of the metal ions remaining in the filtrates were measured respectively. Results are also shown in Table 1.

COMPARATIVE EXAMPLE 2

Charged in a reactor similar to that employed in Example 1 were 50.9 g of pentaethylenehexamine, 300 g of purified water and 52.7 g of sodium hydroxide, followed by addition of 100.1 g of carbon disulfide under the same conditions as those employed in Example 2 to obtain a reaction product. Water was then added to the reaction product to obtain a 20 wt. % aqueous solution. The viscosity of the aqueous solution was 6 mPa.s(25° C.)

Using the above-prepared aqueous solution, the amounts of $Cu^{2+}$ and $Hg^{2+}$ collected on the metal scavenger were respectively determined in the same manner as in Example 1. They were 298 mg-Cu/g and 1068 mg-Hg/g respectively.

Further, sodium monosulfide and purified water were mixed with the above-described reaction product in their corresponding amounts given in Table 1 per 100 parts by weight of the reaction product to obtain a 2 wt. % aqueous solution. To 1000 ml samples of aqueous solutions of four types of metal ions similar to those employed in Example 1, the above-prepared 2 wt. % aqueous solution was added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

COMPARATIVE EXAMPLE 3

Charged in a reactor similar to that employed in Example 1 were 500 g of a 30% aqueous solution of polyethyleneimine (average molecular weight: 20,000) and 1120 g of a 10% aqueous solution of sodium hydroxide, followed by dropwise addition of 212 g of carbon disulfide at 40° C. for 3 hours. After completion of the dropwise addition, the reaction was allowed to proceed at 45° C. for 3 hours to obtain an aqueous solution containing 23 wt. % of the reaction product. Water was then added to the aqueous solution to obtain a 20 wt. % solution. The viscosity of the aqueous solution was 8 mPa.s(25°).

Using the above-prepared aqueous solution, the amounts of $Cu^{2+}$ and $Hg^{2+}$ collected on the metal scavenger were respectively determined in the same manner as in Example 1. They were 183 mg-Cu/g and 532 mg-Hg/g respectively.

Further, the sodium sulfides shown in Table 1 were separately mixed with the 23 wt. % aqueous solution of the above reaction product in their corresponding amounts given in the same table per 100 parts by weight of the aqueous solution, followed by addition of purified water to obtain 2 wt. % aqueous solutions. To 1000 ml samples of aqueous solutions of four types of metal ions similar to those employed in Example 1, the above-prepared 2 wt. % aqueous solutions were added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

COMPARATIVE EXAMPLE 4

Using sodium diethyldithiocarbamate, the amounts of $Cu^{2+}$ and $Hg^{2+}$ collected per gram of sodium diethyldithiocarbamate were respectively determined in the same manner as in Example 1. As a result, they were 95.5 mg-Cu/g and 425 mg-Hg/g respectively. Furthermore, sodium pentasulfide was added to sodium diethyldithiocarbamate in the amount shown in Table 1 per 100 parts by weight of sodium diethyldithiocarbamate, followed by addition of purified water to obtain a 2.0 wt. % aqueous solution. To 1000 ml samples of aqueous solutions of four types of metal ions similar to those employed in Example 1, the above-prepared 2 wt. % aqueous solution was added in the their corresponding amounts given in Table 1. In the same manner as in Example 1, the floc precipitation time periods, amounts of formed flocs and the concentrations of the metal ions remaining in the filtrates were measured respectively. Results are also shown in Table 1.

TABLE 1

| | Sodium sulfide | | Amount of added aqueous solution | Floc precipitation time (min.) | | | |
|---|---|---|---|---|---|---|---|
| | Type | Mixed amount (wt. parts) | of mixture (g/1000 ml) | Aq. $Cu^{2+}$ solution | Aq. $Cd^{2+}$ solution | Aq. $Hg^{2+}$ solution | Aq. $Pb^{2+}$ solution |
| Example | | | | | | | |
| 1 | Sodium monosulfide | 30 | 6.0 | 17 | 15 | 16 | 13 |
| | Sodium pentasulfide | 30 | 6.0 | 15 | 13 | 14 | 12 |
| 2 | Sodium monosulfide | 20 | 6.0 | 18 | 15 | 16 | 15 |
| | Sodium hydrogensulfide | 20 | 6.0 | 15 | 14 | 15 | 13 |
| 3 | Sodium pentasulfide | 35 | 6.0 | 15 | 15 | 14 | 14 |
| | Sodium hydrogensulfide | 35 | 6.0 | 15 | 15 | 13 | 13 |

TABLE 1-continued

| | | | | | | | |
|---|---|---|---|---|---|---|---|
| 4 | Sodium monosulfide | 40 | 6.0 | 13 | 14 | 13 | 13 |
| | Sodium hydrogensulfide | 40 | 6.0 | 15 | 15 | 12 | 13 |
| 5 | Sodium hydrogensulfide | 20 | 6.0 | 16 | 17 | 15 | 14 |
| | Sodium pentasulfide | 20 | 6.0 | 17 | 18 | 14 | 15 |
| 6 | Sodium monosulfide | 30 | 6.0 | 15 | 15 | 14 | 14 |
| | Sodium hydrogensulfide | 30 | 6.0 | 15 | 16 | 16 | 15 |
| 7 | Sodium monosulfide | 10 | 6.0 | 18 | 17 | 17 | 18 |
| | Sodium pentasulfide | 10 | 6.0 | 17 | 17 | 16 | 17 |
| 8 | Sodium monosulfide | 5 | 6.0 | 15 | 15 | 13 | 13 |
| | Sodium pentasulfide | 5 | 6.0 | 14 | 14 | 13 | 12 |
| 9 | Sodium hydrogensulfide | 25 | 6.0 | 14 | 13 | 13 | 14 |
| | Sodium pentasulfide | 25 | 6.0 | 14 | 12 | 13 | 14 |
| Comp. Ex. | | | | | | | |
| 1 | Sodium pentasulfide | 20 | 8.0 | 38 | 35 | 33 | 35 |
| 2 | Sodium monosulfide | 20 | 8.0 | 30 | 36 | 34 | 37 |
| 3 | Sodium monosulfide | 20 | 8.0 | 25 | 25 | 20 | 18 |
| | Sodium pentasulfide | 20 | 8.0 | 24 | 24 | 20 | 17 |
| 4 | Sodium pentasulfide | 20 | 8.0 | 40 | 38 | 35 | 38 |

| | Sodium sulfide | | Amount of added aqueous solution | Amount of formed floc (ml) | | | |
|---|---|---|---|---|---|---|---|
| | Type | Mixed amount (wt. parts) | of mixture (g/1000 ml) | Aq. $Cu^{2+}$ solution | Aq. $Cd^{2+}$ solution | Aq. $Hg^{2+}$ solution | Aq. $Pb^{2+}$ solution |
| Example | | | | | | | |
| 1 | Sodium monosulfide | 30 | 6.0 | 25 | 20 | 15 | 15 |
| | Sodium pentasulfide | 30 | 6.0 | 23 | 18 | 13 | 13 |
| 2 | Sodium monosulfide | 20 | 6.0 | 23 | 19 | 13 | 13 |
| | Sodium hydrogensulfide | 20 | 6.0 | 21 | 17 | 12 | 13 |
| 3 | Sodium pentasulfide | 35 | 6.0 | 21 | 20 | 13 | 14 |
| | Sodium hydrogensulfide | 35 | 6.0 | 20 | 18 | 13 | 15 |
| 4 | Sodium monosulfide | 40 | 6.0 | 18 | 18 | 13 | 14 |
| | Sodium hydrogensulfide | 40 | 6.0 | 18 | 17 | 12 | 14 |
| 5 | Sodium hydrogensulfide | 20 | 6.0 | 22 | 20 | 16 | 15 |
| | Sodium pentasulfide | 20 | 6.0 | 20 | 19 | 15 | 15 |
| 6 | Sodium monosulfide | 30 | 6.0 | 19 | 19 | 13 | 14 |
| | Sodium hydrogensulfide | 30 | 6.0 | 18 | 18 | 13 | 13 |
| 7 | Sodium monosulfide | 10 | 6.0 | 25 | 20 | 18 | 18 |
| | Sodium pentasulfide | 10 | 6.0 | 24 | 22 | 17 | 18 |
| 8 | Sodium monosulfide | 5 | 6.0 | 20 | 22 | 15 | 16 |
| | Sodium pentasulfide | 5 | 6.0 | 21 | 21 | 14 | 15 |
| 9 | Sodium hydrogensulfide | 25 | 6.0 | 18 | 17 | 11 | 12 |
| | Sodium pentasulfide | 25 | 6.0 | 17 | 16 | 13 | 14 |
| Comp Ex. | | | | | | | |
| 1 | Sodium pentasulfide | 20 | 8.0 | 48 | 36 | 34 | 33 |
| 2 | Sodium monosulfide | 20 | 8.0 | 49 | 38 | 33 | 36 |
| 3 | Sodium monosulfide | 20 | 8.0 | 34 | 24 | 19 | 17 |
| | Sodium pentasulfide | 20 | 8.0 | 32 | 22 | 19 | 18 |
| 4 | Sodium pentasulfide | 20 | 8.0 | 52 | 43 | 38 | 36 |

| | Sodium sulfide | | Amount of added aqueous solution | Concentration of metal ions remaining in filtrate (ppm) | | | |
|---|---|---|---|---|---|---|---|
| | Type | Mixed amount (wt. parts) | of mixture (g/1000 ml) | $Cu^{2+}$ | $Cd^{2+}$ | $Hg^{2+}$ | $Pb^{2+}$ |
| Example | | | | | | | |
| 1 | Sodium monosulfide | 30 | 6.0 | 0.6 | 1.2 | 0.01 | 4.5 |
| | Sodium pentasulfide | 30 | 6.0 | 0.06 | 1.0 | 0.008 | 2.8 |
| 2 | Sodium monosulfide | 20 | 6.0 | 0.4 | 0.8 | 0.008 | 2.7 |
| | Sodium hydrogensulfide | 20 | 6.0 | 0.5 | 0.6 | 0.012 | 3.2 |
| 3 | Sodium pentasulfide | 35 | 6.0 | 0.1 | 0.5 | 0.005 | 1.2 |
| | Sodium hydrogensulfide | 35 | 6.0 | 0.2 | 0.3 | 0.007 | 1.5 |
| 4 | Sodium monosulfide | 40 | 6.0 | 0.5 | 0.6 | 0.01 | 1.1 |
| | Sodium hydrogensulfide | 40 | 6.0 | 0.7 | 0.7 | 0.007 | 1.2 |
| 5 | Sodium hydrogensulfide | 20 | 6.0 | 0.05 | 0.1 | 0.006 | 0.9 |
| | Sodium pentasulfide | 20 | 6.0 | 0.06 | 0.2 | 0.007 | 1.1 |
| 6 | Sodium monosulfide | 30 | 6.0 | 0.05 | 0.1 | 0.01 | 0.8 |
| | Sodium hydrogensulfide | 30 | 6.0 | 0.05 | 0.1 | 0.007 | 0.9 |
| 7 | Sodium monosulfide | 10 | 6.0 | 0.8 | 1.2 | 0.02 | 2.5 |
| | Sodium pentasulfide | 10 | 6.0 | 1.2 | 1.6 | 0.03 | 2.0 |
| 8 | Sodium monosulfide | 5 | 6.0 | 0.7 | 0.6 | 0.015 | 1.8 |
| | Sodium pentasulfide | 5 | 6.0 | 0.5 | 0.6 | 0.013 | 1.6 |
| 9 | Sodium hydrogensulfide | 25 | 6.0 | 0.03 | 0.1 | 0.007 | 0.7 |
| | Sodium pentasulfide | 25 | 6.0 | 0.02 | 0.08 | 0.005 | 0.5 |
| Comp. Ex. | | | | | | | |
| 1 | Sodium pentasulfide | 20 | 8.0 | 2.3 | 2.8 | 3.3 | 4.8 |
| 2 | Sodium monosulfide | 20 | 8.0 | 1.8 | 2.0 | 1.9 | 4.3 |
| 3 | Sodium monosulfide | 20 | 8.0 | 0.6 | 3.8 | 0.012 | 7.7 |
| | Sodium pentasulfide | 20 | 8.0 | 0.5 | 3.0 | 0.03 | 6.5 |
| 4 | Sodium pentasulfide | 20 | 8.0 | 0.8 | 3.1 | 2.1 | 4.2 |

TABLE 2

| | Sodium sulfide | | Amount of added aqueous solution | Floc precipitation time (min.) | | | |
|---|---|---|---|---|---|---|---|
| | Type | Mixed amount (wt. parts) | of mixture (g/1000 ml) | Aq. $Cu^{2+}$ solution | Aq. $Cd^{2+}$ solution | Aq. $Hg^{2+}$ solution | Aq. $Pb^{2+}$ solution |
| Example | | | | | | | |
| 1 | Sodium monosulfide | 10 | 2 | 28 | 27 | 25 | 25 |
| | | 10 | 4 | 22 | 20 | 19 | 20 |
| | | 10 | 6 | 19 | 18 | 16 | 16 |
| 2 | Sodium monosulfide | 20 | 2 | 27 | 27 | 24 | 24 |
| | | 20 | 4 | 20 | 20 | 18 | 18 |
| | | 20 | 6 | 17 | 17 | 15 | 15 |
| 3 | Sodium monosulfide | 30 | 2 | 25 | 24 | 21 | 20 |
| | | 30 | 4 | 22 | 21 | 18 | 18 |
| | | 30 | 6 | 17 | 17 | 15 | 16 |
| 4 | Sodium hydrogensulfide | 10 | 2 | 30 | 30 | 28 | 27 |
| | | 10 | 4 | 24 | 23 | 20 | 20 |
| | | 10 | 6 | 20 | 20 | 20 | 18 |
| 5 | Sodium hydrogensulfide | 20 | 2 | 24 | 23 | 20 | 20 |
| | | 20 | 4 | 24 | 24 | 21 | 20 |
| | | 20 | 6 | 21 | 20 | 19 | 19 |
| 6 | Sodium hydrogensulfide | 30 | 2 | 22 | 20 | 18 | 18 |
| | | 30 | 4 | 23 | 23 | 20 | 20 |
| | | 30 | 6 | 20 | 19 | 18 | 18 |
| 7 | Sodium pentasulfide | 10 | 2 | 26 | 25 | 22 | 21 |
| | | 10 | 4 | 25 | 24 | 21 | 21 |
| | | 10 | 6 | 21 | 20 | 20 | 19 |
| 8 | Sodium pentasulfide | 20 | 2 | 24 | 22 | 20 | 20 |
| | | 20 | 4 | 25 | 25 | 22 | 21 |
| | | 20 | 6 | 23 | 23 | 19 | 19 |

| | Sodium sulfide | | Amount of added aqueous solution | Amount of formed floc (ml) | | | |
|---|---|---|---|---|---|---|---|
| | Type | Mixed amount (wt. parts) | of mixture (g/1000 ml) | Aq. $Cu^{2+}$ solution | Aq. $Cd^{2+}$ solution | Aq. $Hg^{2+}$ solution | Aq. $Pb^{2+}$ solution |
| Example | | | | | | | |
| 1 | Sodium monosulfide | 10 | 2 | 25 | 27 | 20 | 20 |
| | | 10 | 4 | 31 | 27 | 24 | 24 |
| | | 10 | 6 | 25 | 26 | 17 | 18 |
| 2 | Sodium monosulfide | 20 | 2 | 22 | 20 | 17 | 17 |
| | | 20 | 4 | 29 | 24 | 22 | 22 |
| | | 20 | 6 | 23 | 22 | 15 | 16 |
| 3 | Sodium monosulfide | 30 | 2 | 20 | 19 | 18 | 18 |
| | | 30 | 4 | 23 | 20 | 19 | 19 |
| | | 30 | 6 | 20 | 20 | 15 | 15 |
| 4 | Sodium hydrogensulfide | 10 | 2 | 22 | 22 | 17 | 18 |
| | | 10 | 4 | 23 | 21 | 20 | 20 |
| | | 10 | 6 | 20 | 20 | 16 | 17 |
| 5 | Sodium hydrogensulfide | 20 | 2 | 18 | 16 | 15 | 15 |
| | | 20 | 4 | 22 | 18 | 16 | 16 |
| | | 20 | 6 | 20 | 19 | 17 | 18 |
| 6 | Sodium hydrogensulfide | 30 | 2 | 21 | 19 | 18 | 20 |
| | | 30 | 4 | 23 | 19 | 18 | 18 |
| | | 30 | 6 | 21 | 20 | 18 | 18 |
| 7 | Sodium pentasulfide | 10 | 2 | 17 | 15 | 13 | 14 |
| | | 10 | 4 | 19 | 19 | 18 | 18 |
| | | 10 | 6 | 19 | 20 | 18 | 18 |
| 8 | Sodium pentasulfide | 20 | 2 | 20 | 18 | 13 | 13 |
| | | 20 | 4 | 22 | 20 | 20 | 19 |
| | | 20 | 6 | 20 | 19 | 18 | 17 |

| | Sodium sulfide | | Amount of added aqueous solution | Concentration of metal ions remaining in filtrate (ppm) | | | |
|---|---|---|---|---|---|---|---|
| | Type | Mixed amount (wt. parts) | of mixture (g/1000 ml) | $Cu^{2+}$ | $Cd^{2+}$ | $Hg^{2+}$ | $Pb^{2+}$ |
| Example | | | | | | | |
| 1 | Sodium monosulfide | 10 | 2 | 18 | 22 | 13 | 28 |
| | | 10 | 4 | 3.5 | 4.8 | 2.2 | 5.3 |
| | | 10 | 6 | 0.1 | 0.7 | 0.02 | 0.4 |
| 2 | Sodium monosulfide | 20 | 2 | 16 | 20 | 11 | 23 |
| | | 20 | 4 | 2.1 | 3.0 | 1.5 | 4.1 |
| | | 20 | 6 | 0.06 | 0.3 | 0.01 | 0.2 |
| 3 | Sodium monosulfide | 30 | 2 | 12 | 15 | 7.8 | 20 |
| | | 30 | 4 | 0.5 | 0.4 | 0.8 | 2.1 |
| | | 30 | 6 | 0.06 | 0.2 | 0.005 | 0.1 |
| 4 | Sodium hydrogensulfide | 10 | 2 | 21 | 24 | 18 | 30 |
| | | 10 | 4 | 3.9 | 5.1 | 2.4 | 6.6 |
| | | 10 | 6 | 0.2 | 0.7 | 0.03 | 0.3 |
| 5 | Sodium hydrogensulfide | 20 | 2 | 17 | 19 | 11 | 23 |
| | | 20 | 4 | 2.6 | 2.9 | 1.7 | 3.8 |
| | | 20 | 6 | 0.05 | 0.07 | 0.005 | 0.3 |

TABLE 2-continued

| | | | | | | | |
|---|---|---|---|---|---|---|---|
| 6 | Sodium hydrogensulfide | 30 | 2 | 10 | 11 | 6.7 | 14 |
| | | 30 | 4 | 2.5 | 2.7 | 1.1 | 3.0 |
| | | 30 | 6 | 0.04 | 0.05 | 0.003 | 0.1 |
| 7 | Sodium pentasulfide | 10 | 2 | 20 | 21 | 14 | 25 |
| | | 10 | 4 | 2.7 | 3.2 | 2.1 | 3.8 |
| | | 10 | 6 | 0.4 | 0.8 | 0.02 | 0.4 |
| 8 | Sodium pentasulfide | 20 | 2 | 16 | 17 | 9.5 | 19 |
| | | 20 | 4 | 2.1 | 2.5 | 0.9 | 2.7 |
| | | 20 | 6 | 0.05 | 0.06 | 0.01 | 0.1 |

We claim:

1. A process for scavenging a metal, which comprises adding a metal scavenger, which is composed of an addition product of a polyamine and an epihalohydrin in which the addition product contains as substituent or substituents at least one carbodithio group and/or at least one carbodithioate salt group introduced therein by substituting the corresponding number of active hydrogen atom or atoms in the addition product, together with at least one of sodium monosulfide, sodium polysulfides and sodium hydrogensulfide to metal ion containing waste water so as to scavenge and remove the metal ions from the waste water.

2. A process according to claim 1, wherein the active hydrogen atom or atoms substituted by the carbodithio group and/or carbodithioate salt group are hydrogen atom or atoms bonded to nitrogen atom or atoms of the polyamine and/or hydrogen atom or atoms of hydroxyl group or groups formed in skeletal epihalohydrin unit or units upon additive reaction of the polyamine and epihalohydrin.

3. A process according to claim 1, wherein the metal scavenger contains, as an N-substituent bonded to a nitrogen atom of the addition product, at least one group selected from the class consisting of alkyl groups, hydroxyalkyl groups and acyl group.

* * * * *